June 1, 1965
HISAO TAKEI ETAL
3,186,458
VEGETABLE JUICE EXTRACTOR
Filed July 9, 1963
5 Sheets-Sheet 1
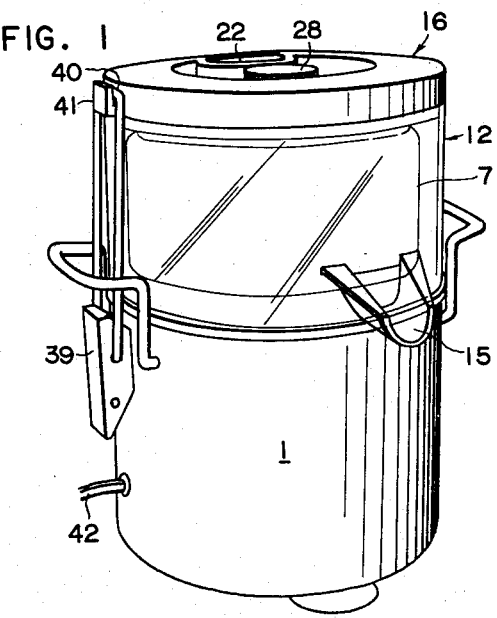
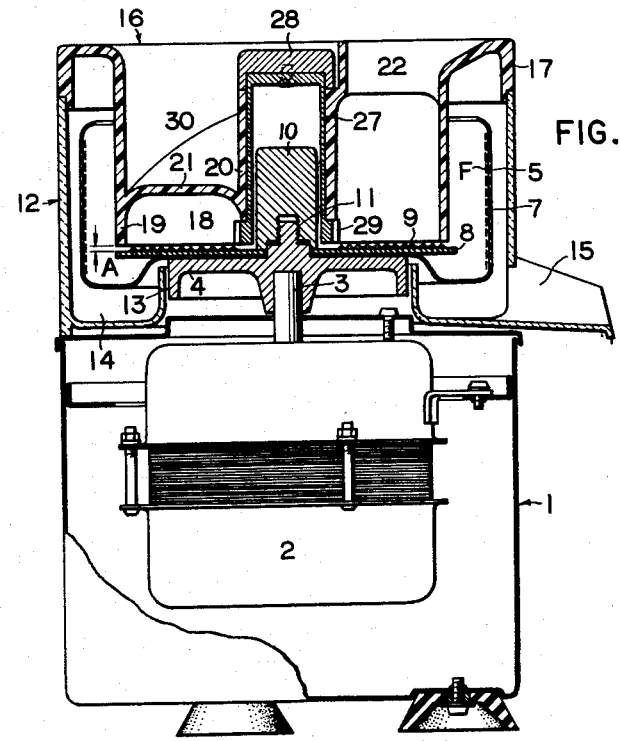

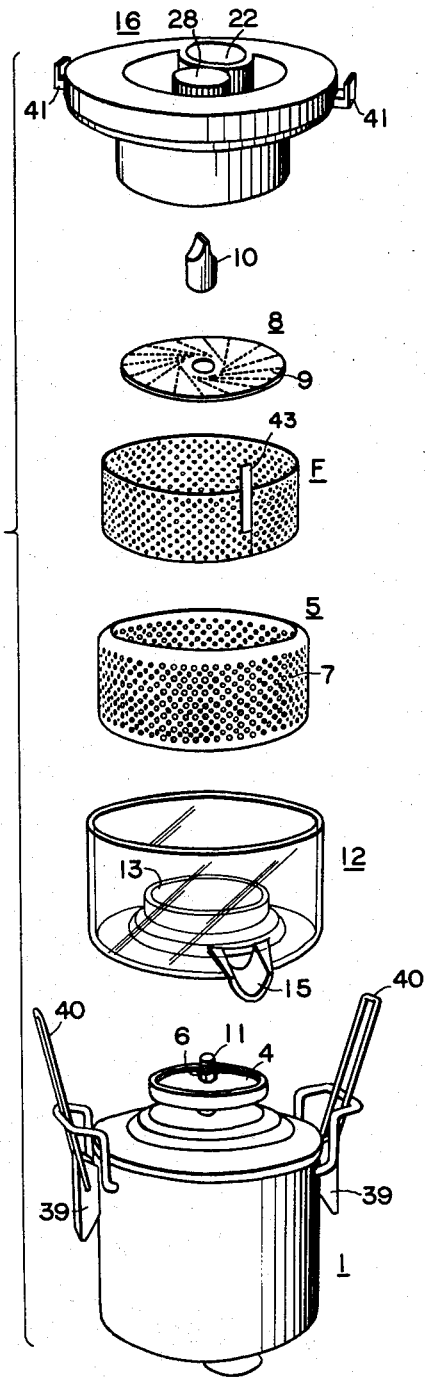

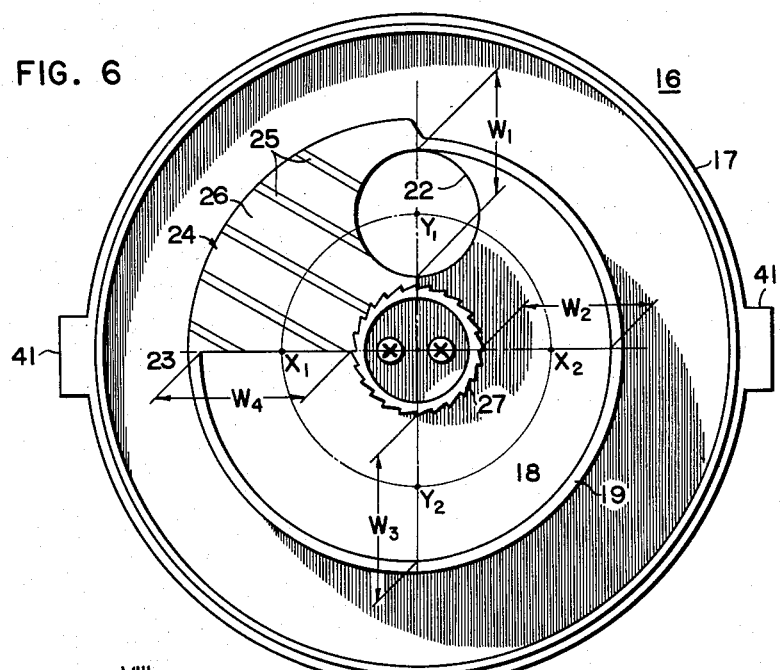
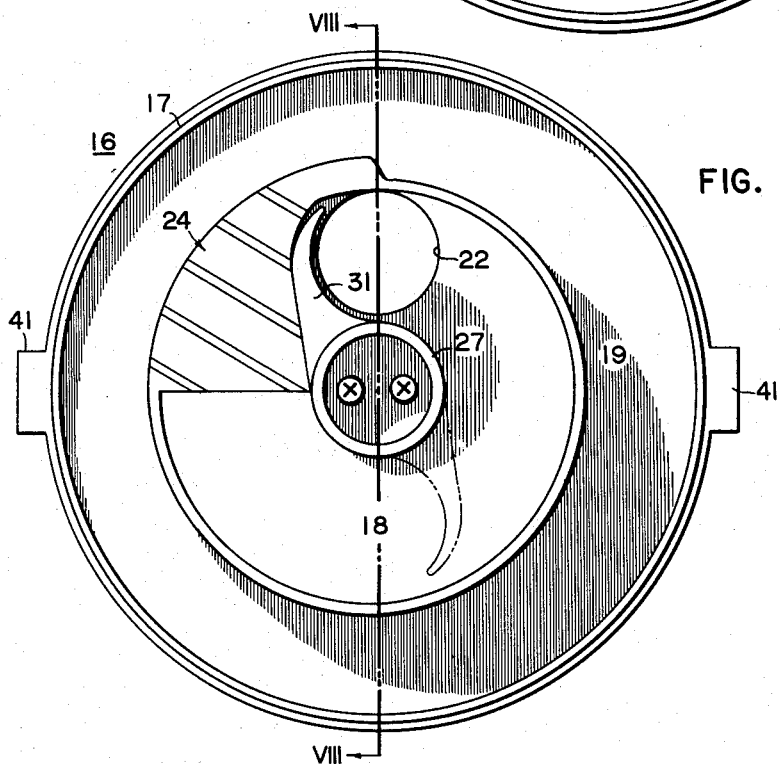

June 1, 1965 HISAO TAKEI ETAL 3,186,458
VEGETABLE JUICE EXTRACTOR
Filed July 9, 1963 5 Sheets-Sheet 5

United States Patent Office 3,186,458
Patented June 1, 1965

3,186,458
VEGETABLE JUICE EXTRACTOR
Hisao Takei, Ota, Nobumichi Hattori, Nitta-gun, and Naoyuki Iwata, Ota, Japan, assignors to Mitsubishi Denki Kabushiki-Kaisha, Chiyoda-ku, Tokyo, Japan
Filed July 9, 1963, Ser. No. 293,690
Claims priority, application Japan, July 11, 1962,
37/29,154, 37/29,155, 37/29,156; (utility models)
37/38,194, 37/38,195, 37/38,196
7 Claims. (Cl. 146—76)

This invention relates to improvements in the electrically operated type of vegetable juice extractors.

In operating a vegetable juice extractor of the prior art type it is commonly required to successively throw a raw material such as vegetables or fruit in small doses into a feed cylinder provided on a cover for the extractor and to repeatedly force the thrown-in raw material toward the bottom of the cylinder by a manually operated piston or push rod. This procedure, however, is troublesome and consumes time and labor.

An object of the invention is to provide an improved vegetable juice extractor in which vegetables as available can be automatically charged without the necessity of using the aforesaid piston to charge vegetables and which can extract from the charged vegetables their juice in a large amount within a relatively short operating time as compared with the prior type of vegetable juice extractors.

Another object of the invention is to provide an improved vegetable juice extractor wherein a centrifugal separator cage rotating at a high speed is prevented from vibrating due to both impact occurring when the resulting vegetable waste of great amount strikes against and adheres to the internal surface of the cage and uneven distribution of the adhering waste on that surface and by which the amount of vegetables used is saved.

A further object of the invention is to provide an improved vegetable juice extractor capable of effectively passing a charged raw material to an exhaust port of a feed vegetable passage without the material caught by the side walls of the passage.

A still further object of the invention is to provide an improved vegetable juice extractor of the type described in the preceding paragraph including manually operated means for forcedly passing a charged raw material to an exhaust port of a feed vegetable passage even if the raw material would be of size large sufficiently to be caught by the side walls of the passage and capable of performing its continuous operation.

Another object of the invention is to provide an improved vegetable juice extractor of the type described in the preceding paragraph including automatic means for forcedly passing a charged raw material to an exhaust port of a feed vegetable passage even if the raw material would be of size large sufficiently to be caught by the side walls of the passage whereby labor is minimized.

An additional object of the invention is to provide an improved vegetable juice extractor ensuring that its function of forcedly feeding a raw material is perfectly performed without interfering with the charging and movement of the raw material.

With the aforesaid objects in view, the invention resides in improvements in the prior art type of vegetable juice extractor which include the provision of a feed vegetable passage of annulus type having a vegetable throwing-in port and an exhaust waste port and disposed in the form of an inverted groove on the lower face of a cover member so as to overlap the upper surface of a rotatory disk on which a multiplicity of grater edges are formed, said annular passage having its depth or height gradually decreased in the direction of rotation of the edged disk. This arrangement ensures that a raw material being grated is normally held between the ceiling surface of the passage and the upper surface of the edged rotatory disk and permits a limited space below the lower surface of the cover member to provide the feed material passage as long as possible.

In order to prevent any vibration of the device and to save a raw material used, said feed material passage may be preferably provided at its exhaust port with an extension contiguous to the ceiling surface thereof and disposed so as to form a parallel spacing between the same and the rotary grating disk with that surface of the extension opposite to the rotary grating disk being provided with a plurality of indents for the purpose of additionally finely dividing the residue of the raw material.

In order to smoothly pass the charged material through the feed material passage toward its exhaust port, the width or breadth of the passage may be advantageously increased from its throwing-in port toward its port. Alternatively the feed material passage may have its width or breadth at least uniform throughout the length.

In order to forcedly move a charged material of large size sufficiently to clog the feed material passage, through the same, feed means of blade type adapted to be externally operated at will may be conveniently provided projecting into the feed passage.

For the purpose of avoiding manual operation of the feed blade just described, the same may be arranged to be rotated along with the rotary grating disk.

Further, in order to ensure the perfect feed of a charged material through the feed material passage, the latter may preferably include a feed blade having its radial length substantially equal to that of the passage and arranged to be automatically returned back to and stationary at its position where the same does not interfere with throwing-in and feeding operation of the charged material, after the feed blade has served.

The features considered characteristics of the invention have been generally outlined above. The invention will become more readily apparent from the following detailed description taken in conjunction with the accompanying drawings in which:

FIG. 1 shows a perspective view of a vegetable juice extractor constructed in accordance with the teachings of the invention;

FIG. 2 shows a central longitudinal sectional view of the device illustrated in FIG. 1;

FIG. 3 shows an exploded perspective view of the device illustrated in FIGS. 1 and 2 for illustrating the various components thereof;

FIG. 6 shows a bottom view of the cover member illustrated in FIG. 4;

FIG. 7 shows a view similar to FIG. 6 but illustrating another form of manually operated means for forcedly feeding a raw material according to the teachings of the invention;

Throughout the figures the same reference numerals designate similar parts.

Figure 4:
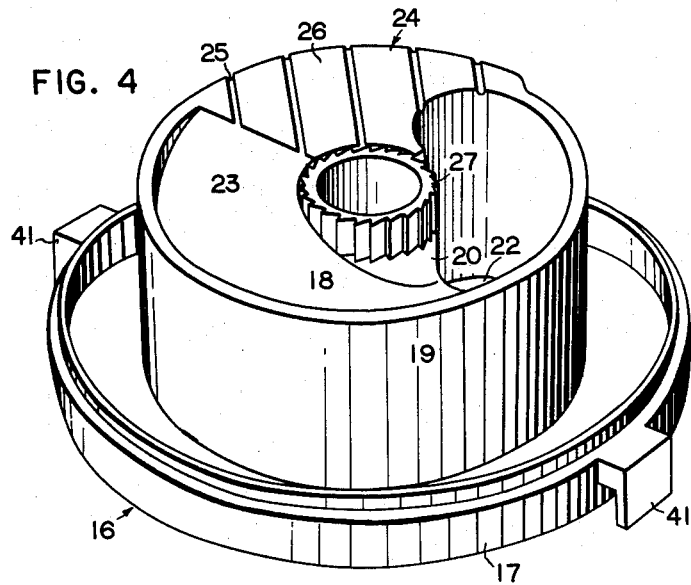
FIG. 4 shows a perspective view of a cover member for the device illustrated in FIGS 1 through 3, in its inverted position.

Referring now to FIGS. 1, 2 and 3 of the drawings, there is illustrated a vegetable juice extractor constructed in accordance with the teachings of the invention. The juice extractor illustrated comprises a lower casing of any suitable metallic material generally designated by the reference numeral 1 and including an electric motor 2 suitably mounted therein. The motor 2 includes a driving shaft 3 projecting beyond the upper surface of the lower casing 1 and having its upper end portion onto which a circular disk-like flywheel 4 of any suitable metallic material is fixedly fitted.

A separator cage of centrifugal type 5 which may be made of aluminum is shown as being superposed upon the upper surface of the flywheel 4 and secured to the same on its upward projection 6 centrally disposed thereon. The separator cage 5 includes on its peripheral surface a multiplicity of fine holes 7 approximately 3 mm. in diameter and is adapted to be used for the purpose of producing a vegetable juice. In this case, the internal peripheral surface of the separator cage 5 is preferably covered with a cylindrical filter F made of any suitable plastic sheet and including a multiplicity of very fine perforation whose diameter may be of about 0.8 mm. It will be understood that, if the device is desired to be used as a grater that the separator cage 5 and the filter F are removed from the same. A rotary grating disk of a stainless steel 8 can be selectively superposed on and secured to either the internal bottom surface of the separator cage 5 or the upper surface of the flywheel 4 as the case may be and includes a multiplicity of grating edges 9 projecting upwardly from the upper surface in radial arrangement as shown in FIG. 3. An assembly of the flywheel 4 and the rotary grating disk 8 with or without the separator cage 5 disposed therebetween can be firmly held in position by screwing a locking nut 10 of any suitable plastic composition onto a screw-threaded portion 11 formed on the projection 6. Thus, upon energization, the electrode motor 2 can rotate said assembly through its driving shaft 3.

Disposed upon the lower casing 1 is a juice collecting cylindrical vessel 12 of any suitable transparent plastic composition open at its upper end and provided on bottom with a central opening 13 within which the flywheel 4 is positioned concentrically thereto. Further the juice collecting vessel 12 includes an annular space 14 disposed around the central opening 13 and at a level lower than that of the same for collecting the resulting juice and/or the resulting finely grated material, and is provided on the lower portion with a discharge outlet 15 with a lip through which the juice and/or grated material collected in the annular space 14 may be discharged. The juice collecting vessel 12 is normally closed at the upper end with a cover member of substantially hat-like shape generally designated by the reference numeral 16.

The cover member 16 includes a cylindrical pendent flange 17 as the outer periphery adapted to just rest on and partially fitted into the upper end of the outer cylindrical wall of the juice collecting vessel 12. It is to be noted that the cylindrical pendent flange 17 should have such an axial length that, upon disposing the cover member on the juice collecting vessel, the lower end of the former is maintained a predetermined distance A measured from the upper surface of the edged disk 8. It has been found that the distance may be preferably 1.5 mm. The cover member 16 is provided on the lower side of the intermediate annular region with an annular passage 18 for feeding a raw material in the form of a groove open at the lower end. For the purpose to be apparent later, the annular feed passage 18 is designed and constructed such that the same has its center on the axis of rotation of the rotary disk and a spacing between the ceiling surface thereof and the upper surface of the rotary grating disk gradually decreasing in the direction of disk's rotation. The annular passage 18 is defined by a lower portion of an upright cylindrical wall element 19 having its upper end connected to the upper end of the aforesaid pendent flange 17 through an annular flat element, a lower portion of a hollow cylindrical element 20 vertically projecting from the central part of the cover member 16 and surrounding the locking nut 10, and an annular ceiling element 21 connecting the elements 19 and 20 on the relatively lower parts and successively approaching the upper surface of the edged disk 8 on the outer peripheral portion up to the predetermined distance A as above described. It will be appreciated that, due to its annular shape the feed material passage 18 can be made as long as possible in a limited area defined by the rotary grating disk 8 whereby a thrown-in raw material can be subject to a grating treatment for a longer time. It is to be noted that the cylindrical wall element 19 has its lower extremity spaced away from the upper surface of the rotary grating disk 8 by the predetermined distance A. The annular passage can be preferably made simultaneously with the abovementioned elements 19, 20 and 21 by molding technique.

In addition, the cover member 16 is provided on that portion of the ceiling element 21 positioned at its highest level with a vertical port inlet 22 through which a raw material can be thrown into the device and on that portion of the ceiling element positioned at its lowest level with an outlet 23 for exhausting the treated material or waste. The material throwing-in inlet 22 extends through the ceiling element 21 of the feed material passage 18 and opens on the upper surface of the cover member 16.

The ceiling element 21 includes its extension 24 contiguously extending from that portion thereof facing the exhaust waste outlet 23 in the direction of disk's rotation and in parallel relationship with respect to the rotary grating disk 8 with the distance therebetween maintained at the predetermined minimum value A as previously described. As best shown in FIG. 4, the extension 24 is provided on that face thereof opposite to the rotary grating disk 8 with a plurality of spaced indents or grooves of V shape cross section 25 leaving one flat protuberance 26 between any pair of adjacent notches for the purpose of further grating the treated raw material. The extension 24 including the grooves and protuberances 25 and 26 can be preferably formed along with the cover member 16. The notches 25 are preferably disposed nearly orthogonally to the direction to rotate the edge disk 8 whereby the extension 24 can exhibit a resistance to the partially grated raw material as passing over the same in the flat thin form to prefectly grate the same.

In FIG. 2 the reference numeral 27 generally designates manually operated means for forcedly advancing that portion of a raw material caught by the side walls of the feed material passage 18 on the way of the same for certain reasons. The illustrated means includes a hollow cylindrical element rotatably fitted in the central hollow cylindrical element 20 and surrounding the locking nut 10. This element includes an operating cylindrical knob 28 slightly greater in diameter than the same and secured to its top as by a screw and also is provided on the lower end with a hub including a plurality of radial blades 29 formed on the entire of the outer periphery in such a way as to slightly extend into the region of the feed material passage 18. The knob 28 and the hub serve to maintain the element 27 in position. It is to be understood that the lower surface formed of the lower ends of both the hub and the blades 29 should be at the predetermined distance A measured from the upper surface of the edged disk 8.

FIG. 2 also shows an annular space 30 formed between the intermediate cylindrical wall element 19 and the central cylindrical element 20.

Figure 5:
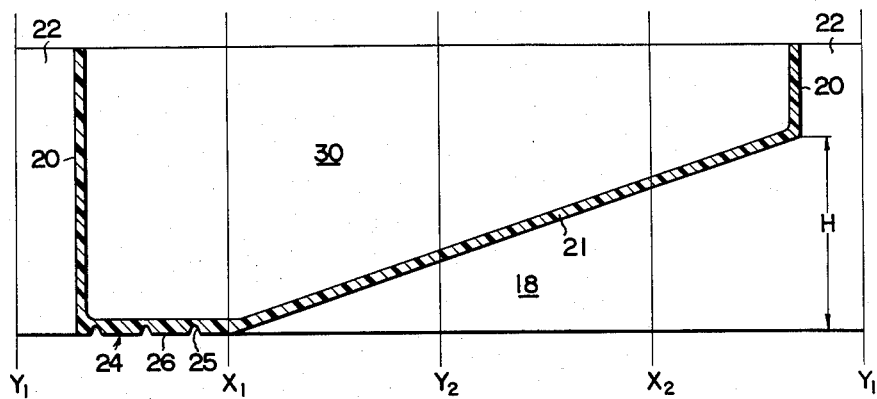
FIG. 5 shows a development of a feed material passage formed on the lower surface of the cover member illustrated in FIG. 4.

Referring now to FIG. 5 of the drawings, there is illustrated the development of the feed material passage of groove type 18 according to the invention. As shown in FIG. 5, the ceiling element 21 of the feed material passage 18 is tilted at an angle to the bottom plane in the direction to rotate the edged disk 8. In other words, the feed passage 18 has its depth or height H gradually decreasing in linear fashion from the maximum magnitude at its throwing-in port 22 to the minimum magnitude or zero at its exhaust port 23. It has been found that, for the best results, the magnitude of the above angle should be 18 degrees. It will be appreciated that, by utilizing this tilt of the ceiling element or this linear decrease in height of passage, a charged raw material becoming gradually smaller while advancing along the feed material passage can be pressed within the feed passage.

Under these circumstances, in order that the raw material moving along the feed passage while being grated is prevented from being caught by any portion of each side wall of the passage, the width or breadth of the passage should be so designed that it be successively increased from the material throwing-in port 22 to the exhaust waste port 23. More specifically as clearly shown in FIG. 6, the width or breadth of the feed material passage has its minimum magnitude $W_1$ at the throwing-in port 22 or at a point designated by the reference character $Y_1$, and its maximum magnitude $W_4$ at the exhaust port 23 or at a point $X_1$ angularly spaced away from the point $Y_2$ by a certain angle in this case $3/2\pi$ radians. At the intermediate point such as those designated by the reference characters $X_2$ and $Y_2$ and angularly spaced away from the point $Y_2$ by angles of $\pi/2$ and $\pi$ radians respectively the width or breadth has its magnitudes $W_2$ and $W_3$ between the minimum and maximum magnitudes $W_1$ and $W_4$ with the magnitude $W_2$ smaller than the magnitude $W_3$. Alternatively the feed material passage 18 may have its width or breadth at least uniform throughout its length.

Various components as previously described can be assembled together in the manner shown in FIG. 2. Then a pair of latches 39 rigidly secured in diametrically opposite relationship to the lower casing 1 are engaged at their upper ends 40 by the associated projections 41 formed on the cover member 16 to couple the lower casing 1, the vessel 12 and the cover member 16 into a single unitary structure as shown in FIG. 1. Now a cup (not shown) adapted to collect a vegetable juice produced by the device can be put immediately below the discharge port 15 formed on the collecting vessel 12 and a pair of plugs 42 for electric power suitably secured to the lower casing can be electrically connected to a commercial electric line through an electric conductor (not shown) whereby the device is ready for operation. Under these circumstances, an electric switch (not shown) incorporated into the device can be turned on to energize the motor 2.

On the other hand, a suitable amount of a raw material such as apple, persimmon, carrot or radish has been preliminarily cut into suitable sizes. As an example, approximately 1.6 kilograms of apples (which correspond nearly to eight apples) may be generally cut into eight equal pieces for each one.

After the lapse of from 2 to 3 seconds clocked from a time the aforesaid switch has turned on, both the separator cage 5 and the rotary grating disk 8 will start to be rotated at their full common speed, for example, at a speed as high as the order of 3000 r.p.m. At that time, the pieces of apple prepared in the manner as above explained are continuously thrown into the throwing-in inlet 22 one after another and fall upon the rotating rotary grating disk 8. The apple pieces having fallen upon the rotating disk 8 are fed into the feed passage 18 as the latter rotates. While maintaining sandwiched between the grating edges 9 on the rotating disk 8 and the ceiling element 21 of the passage 18 the apple pieces are progressively grated by means of the grating edges 9. Namely those portions of their lower surfaces contacting the edges are progressively grated by means of the same by a thickness corresponding to the height of the grating edges to thereby be converted into the finely divided state.

The finely divided material is then introduced through the aforesaid clearance A into the separator cage of centrifugal type 7 positioned outside of the clearance and rotating at the high speed. Within the separator cage 7 the introduced material including its juice is separated into the juice and the solid by means of both the filter sheet F disposed on the inside of the cage and the latter. The separated juice is collected by the juice collecting vessel 12 and more particularly in the annular recessed space 14 and then will successively flow into the aforesaid cup through the discharge port 15.

On the other hand, the apple pieces left in the feed material passage 18 are being successively grated from their undersides while advancing along the feed passage. Thus the apple pieces are successively reduced in thickness or flattened and simultaneously moved along the feed passage toward the exhaust port 23. When the thicknesses of the apple pieces have reached their magnitude below which the piece can not be grated, that is, when they have been less than the height of the grating edges 9, the apple pieces will enter spaces between the grating edges and pass to the extension 24 of the ceiling element 21 as the rotary grating disk 8 is rotated.

In the region of the extension 24 the very flattened material will be finely divided by the action of the notches 25 and the flat protuberances 26. The material thus finely divided is projected tangentially into the separator cage 7 through the clearance A between the lower end of the intermediate cylindrical wall element 19 and the rotating edged disk 8 and due to the action of the centrifugal force provided by the rotating disk. The projected materials are substantially uniformly accumulated on the peripheral wall of the separator. Of course, the juice included in that material is similarly subject to centrifugal separation and flows into the cup through the annular recessed space 14 and the discharging port 15.

In this way, the juice can be continuously produced while the fully loaded cup is replaced by an empty cup. However, during the operation, the internal side wall surface of the separator cage 7 will include a layer of the solid material attached thereto and progressively increasing in thickness. The layer of solid material is composed of the finely divided waste and the relatively large waste discharged through the exhaust port 23. The layer of solid waste attached to the separator causes reduction in a rate of separation for juice and probably even vibration of the separator cage. Therefore, the aforesaid switch may be preferably turned off to stop the operation of the device when 1.6 kilograms of apples as previously set forth have been fully grated. It will be readily understood that the maximum weight of vegetable capable of being grated without both considerable reduction in rate of separation and vibration of the device depends upon the type of the vegetable used and can be readily determined by a few tests.

It has been found that approximately 1.6 kilograms of applies which has been discovered to be the optimum weight for one batch operation yielded 1200 cc. of apple juice. Therefore, defining a rate of separation S in percent as $$S = \frac{\text{weight of juice in grams}}{\text{weight of apples in grams}} \times 100$$

the present device can be operated with a rate of separation equal to 74%. Also an operating period of time required for treating the aforesaid weight of apples has been found to be only 40 seconds which is less than a half a period of time necessary for treating the same weight of apple by using the conventional type of vegetable juice extractors including a piston or push rod.

While the foregoing description has been made in conjunction with a raw material of massive solid type such as apple, persimmon, carrot, radish or the like and more particularly with apple the device of the invention may be effectively used to produce a juice from the leaf type of vegetables such as cabbage, Chinese cabbage, spinach or the like. In the latter case and especially where a juice is desired to be produced from cabbage, a weight of the raw material capable of being satisfactorily treated during one batch operation is preferably approximately 400 grams which, in turn, yields 240 cc. of the juice for about 60 seconds and with a rate of separation equal to 58%. Thus it will be appreciated that the treatment of a raw material originally in the form of a flat leaf has a tendency to prolong its treating period of time.

After the juice has been completed to be produced the lower end of the latch 39 can be pulled up to disengage the upper end 40 of the same from the projection 41 to thereby remove the cover member 16 from the lower casing 1. Then the filter sheet F including the waste attached thereto is drawn out by having its tab 43 grasped by operators' fingers and then rinsed in the form of a plane within water whereby the attached waste is washed away. Then the cleaned filter sheet is put in position within the separator cage 5. Thereafter the procedure as previously described can be repeated to produce another juice.

If the device is desired to be laid away after the production of a juice has been completed then the locking nut 10 can be removed from the screwed portion 11 to disassemble the various components in the manner as shown in FIG. 3. The disassembled components are washed and then again assembled in the manner as shown in FIG. 2 for laying away.

It will be readily understood that, during the normal operation there may occur a trouble that one portion of a charged raw material spreads over both side walls of the groove-shaped feed passage 18 whereby the same and the subsequent portion of the raw material are not moved toward the exhaust port with the result that an extraordinary sound is generated. Such a trouble can readily be removed by operating the manually operated feed means 27 according to the invention. More specifically, the operating knob 28 projecting beyond the central portion of the cover member 16 can be manually turned from the throwing-in side toward the exhaust side. This turning movement of the knob 28 causes turning of the feed blades 29 secured to the lower end of the feed means 27 in the same direction to move that portion of the raw material brought in stationary state within the feed material passage 18 to thereby change the position of the same. Thus the device can readily be put in good order. In this connection, it is to be noted that the gradual increase in width or breadth of the feed material passage from its throwing-in port to its exhaust port previously described in conjunction with FIG. 6 aids in preventing any portion of a charged raw material from halting on the way of the feed passage.

Figure 8:
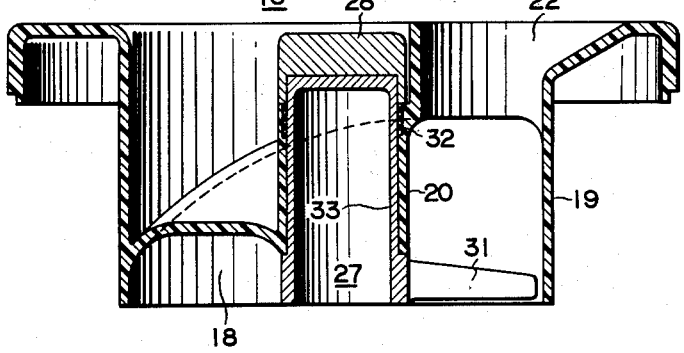
FIG. 8 shows a longitudinal sectional view of the cover member of FIG. 7 taken along the line VIII—VIII of FIG. 7 and as viewed in the direction of the arrows.

FIGS. 7 and 8 show a modification of means for forcedly feeding a raw material. As shown in FIGS. 7 and 8, manually operated means 27 for forcedly feeding the raw material include a single feed blade 31 having its length extending substantially over the entire width or breadth of the feed passage 18, in place of the multiplicity of feed blades 29 as shown in FIGS. 2 and 6. The feed means 27 further include a coiled spring 32 disposed between a hollow cylindrical element 33 forming a part of the feed means 27 and a central hollow cylindrical element 20 of a cover member 16 identical with the cover member 16 as previously described in conjunction with FIG. 2 and preferably on the upper portion thereof (see FIG. 8). The coiled spring 32 has both ends secured to the elements 20 and 33 respectively and serves to normally bias the single feed blade 31 to its position between the extension 24 and the throwing-in port 22 or its position designated by solid line 31 in FIG. 7. Thus the feed blade 31 at its normal or inoperative position does not prevent material from being freely thrown into a throwing-in port 22 and from being grated while advancing along a feed passage 18.

If a trouble that one portion of the charged raw material has halted on the way of the feed material passage 18 would occur then an operating knob 28 secured to the top of the cylindrical element 33 may be manually rotated to displace the single feed blade 31 to its position illustrated by dotted-and-dashed line FIG. 7 against the action of coiled spring 32. As in the previous case, then, the knob 28 and hence the single blade 31 is manually turned toward the exhaust port to thereby forcedly move the halted portion of the raw material toward the exhaust port for the purpose of continuing grating operation without hindrance.

Figure 9:
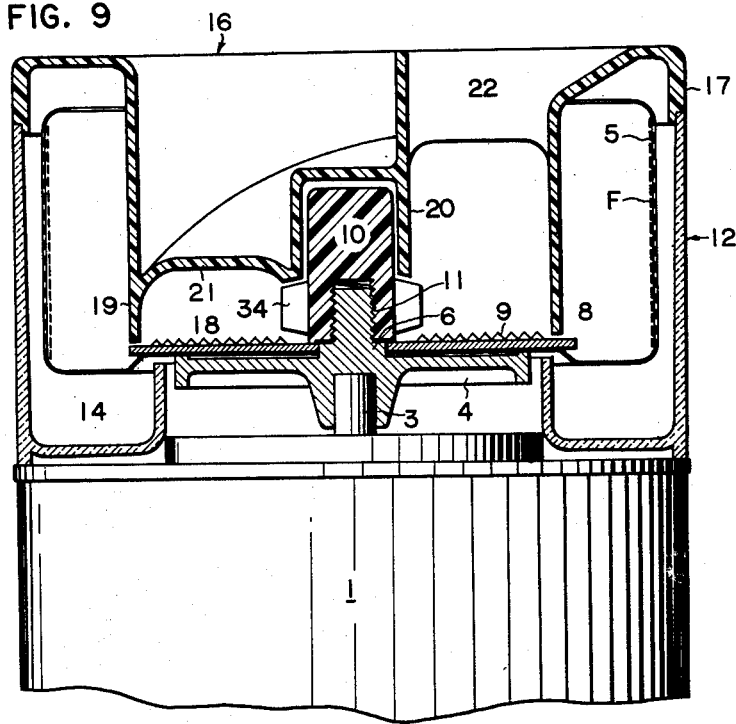
FIG. 9 shows a fragmental view, partly in section and partly in elevation of another embodiment of the invention including automatic means for forcedly feeding a raw material.

FIG. 9 shows another modification of means for forcedly feeding a raw material. An arrangement illustrated in FIG. 9 is essentially different from the arrangements shown in FIGS. 2 and 6, and FIGS. 7 and 8 in that a pair of radial feed blades 34 are mounted integrally to a locking nut 10 so as to be disposed in diametrically opposite relationship. However, as in FIGS. 2 and 6, the blades project slightly into a region of a feed material passage 18. Thus it is apparent that during operation the pair of feed blades 34 are rotated along with a rotary grating disk 8 such as previously described to continuously advance a charged material in automatic fashion. Therefore, any manually operated feed means 27 such as previously described can be omitted. In addition, this ensures that a thrown-in raw material is automatically fed into the feed passage by rotational movement of the rotary grating disk 8 to simplify the feed-in operation.

If desired, the pair of diametrically opposed blades 34 may be secured to either the upper surface of the rotary grating disk 8 on the central portion or a central projection 6 of a flywheel 4 on the upper end surface with the satisfactory results.

Figure 10:
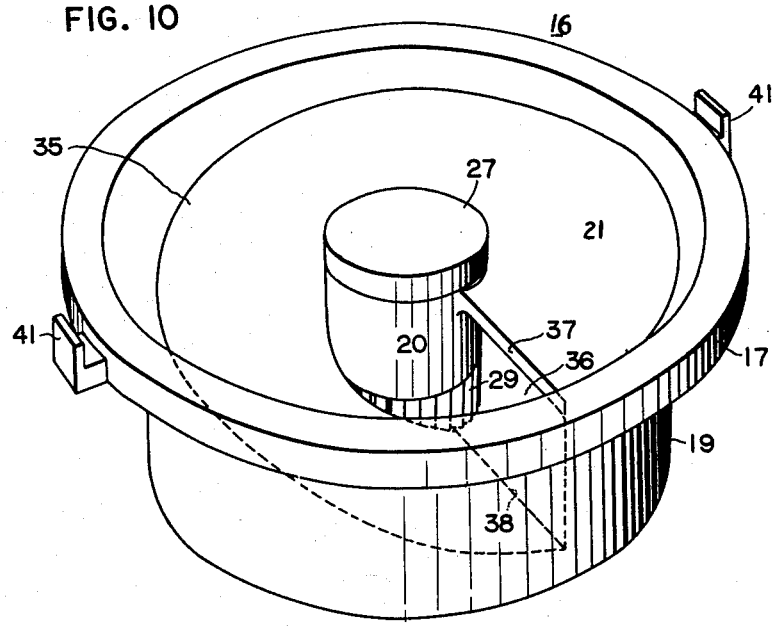
FIG. 10 shows a perspective view of a further embodiment of a cover member in which a vegetable throwing-in port is formed in a different position.

Finally, FIG. 10 shows another embodiment of the invention. An arrangement illustrated in FIG. 10 is substantially identical with that shown in FIG. 2 except that, in order to accommodate a weight of a raw material from which its juice may be produced in volume sufficient to full a cup whose volume is in the order of 170 cc., a cover member 16 is provided on the upper side with an annular recessed space 35 in the similar manner as the annular space 30 previously described for FIG. 2 and that a port 36 through which the raw material is thrown-in opens between the upper and lower sides 37 and 38 of a bottom plate 21 for said space 35 and perpendicularly to the plane passing through the both sides. This permits the raw material within the space 35 to be continuously thrown through the throwing-in port 36 providing the end of the space into a feed material passage.

From the foregoing it will be appreciated that the objects of the invention have been accomplished by the provision of a feed material passage of special configuration where a raw material is grated and means for forcedly feeding the raw material along the feed material passage.

While the invention has been illustrated and described in conjunction with certain preferred embodiments thereof it is to be understood thta various changes in the detail of construction and the arrangement and combination of parts may be made without departing from the spirit and scope of the invention.

What we claim is:

1. In a vegetable juice extractor comprising juice separator means of centrifugal type, rotary grating disk member within said juice separator means formed on its upper surface with a multiplicity of grating edges for grating a raw material, and a cover member including an inlet open adjacent to the upper surface of the rotary grating disk member to deliver the raw material onto said upper surface therethrough, the combination of a feed material passage formed on the lower surface of said cover member into an annular groove having its bottom open end facing the said upper surface of said rotary grating disk member, the distance between the upper surface of said feed material passage and the upper surface of said rotary grating disk member gradually decreasing in the direction of rotation of said rotary grating disk member, the width of said annular feed passage in a radial direction gradually increasing in the direction of rotation of said rotary grating disk member, said feed material passage communicating at one end at which said distance is maximum with said inlet, an exhaust outlet disposed at the other end of said feed material passage at which said distance is minimum to communicate said feed material with the interior of said juice separator means, and an annular clearance formed between the lower end of the outer side wall of said annular feed passage and said upper surface of said rotary grating disk member through which said annular feed passage communicates laterally with the interior of said juice separator means, said rotary grating disk member, when rotating, being operative to grate the raw material received through said inlet in said feed material passage while advancing said raw material along the same toward said exhaust outlet to thereby finely divide the raw material and produce a juice, and to automatically project the finely divided raw material and the juice into said juice separator means through said clearance for centrifugal separation, with the flattened residue of the raw material left within said feed material passage being automatically discharged into said juice separator means through said exhaust outlet.

2. A juice extractor as claimed in claim 1, wherein said annular feed passage is provided on the upper surface adjacent said exhaust outlet with an extension disposed in parallel spaced relationship with respect to said upper surface of said rotary grating disk member, said surface of said extension opposite to said upper surface of said disk member including a plurality of V-shaped grooves disposed approximately orthogonally to the direction of rotation of the grating disk and leaving one flat protuberance between each pair of adjacent grooves for additionally finely dividing the residue of the raw material.

3. A juice extractor as claimed in claim 2, in which said extension disposed in parallel spaced relationship to said disk has an angular extent of the order of $\pi/2$ radians.

4. A juice extractor as claimed in claim 1, comprising manually operated means for forcibly feeding the raw material within said annular feed passage including a plurality of feed blades radially projecting into said annular feed passage.

5. A juice extractor as claimed in claim 4, in which said feeding means comprises a hollow rotatable shaft concentric with said disk and having said feed blades on a lower portion thereof, said shaft extending upwardly and being provided at its upper end with means for rotating said shaft.

6. A vegetable juice extractor as claimed in claim 1, comprising automatic means for forcibly feeding the raw material within said annular feed passage including a plurality of feed blades radially projecting into said annular feed passage and rigidly coupled to said edged rotary disk member to rotate therewith.

7. A vegetable juice extractor as claimed in claim 1, comprising manually operated means for forcibly feeding the raw material within said annular feed passage including a single blade extending substantially over the radial width of said annular feed passage and having an operative position in which the same can be manually moved to forcibly move the raw material and an inoperative position in which it does not prevent the raw material from being received in and from being moved along the feed passage, said blade being capable of being manually displaced from its inoperative position to its operative position and means for automatically returning said blade from its operative position to its inoperative position.

References Cited by the Examiner
UNITED STATES PATENTS

| | | |
|---|---|---|
| 2,297,880 | 10/42 | Fredrickson. |
| 2,325,779 | 8/43 | Kraber. |
| 2,844,176 | 7/58 | Barrows et al. |
| 2,901,015 | 8/59 | Swenson et al. |

J. SPENCER OVERHOLSER, *Primary Examiner.*